United States Patent
Mochizuki et al.

(10) Patent No.: US 8,425,834 B2
(45) Date of Patent: Apr. 23, 2013

(54) METHOD FOR PRODUCING CLAD MATERIAL, AND CLAD MATERIAL

(75) Inventors: Chitoshi Mochizuki, Tokyo (JP); Hiroshi Kaita, Amagasaki (JP); Takeshi Kayama, Amagasaki (JP)

(73) Assignee: IHI Corporation, Tokyo (JP)

( * ) Notice: Subject to any disclaimer, the term of this patent is extended or adjusted under 35 U.S.C. 154(b) by 875 days.

(21) Appl. No.: 12/438,222

(22) PCT Filed: Aug. 22, 2007

(86) PCT No.: PCT/JP2007/000895
§ 371 (c)(1),
(2), (4) Date: Aug. 26, 2009

(87) PCT Pub. No.: WO2008/023463
PCT Pub. Date: Feb. 28, 2008

(65) Prior Publication Data
US 2009/0324984 A1    Dec. 31, 2009

(30) Foreign Application Priority Data
Aug. 24, 2006   (JP) ................................. 2006-228207

(51) Int. Cl.
*B22F 7/02*   (2006.01)
*B23K 1/00*   (2006.01)

(52) U.S. Cl.
USPC .......................... 419/8; 228/248.5; 228/262.9

(58) Field of Classification Search .................. 419/8, 9, 419/43; 228/122.1, 248.1, 248.5, 262.1, 228/262.9
See application file for complete search history.

(56) References Cited

U.S. PATENT DOCUMENTS

| | | | | |
|---|---|---|---|---|
| 2,297,554 A | * | 9/1942 | Hardy et al. | 228/56.3 |
| 2,662,270 A | * | 12/1953 | Mitchell et al. | 148/242 |
| 3,073,270 A | * | 1/1963 | Johnson et al. | 148/24 |
| 3,163,499 A | * | 12/1964 | Bray | 428/561 |
| 3,821,018 A | * | 6/1974 | Grant | 427/377 |
| 4,078,713 A | * | 3/1978 | Marshall | 228/220 |
| 4,101,691 A | * | 7/1978 | Borchert | 427/229 |

(Continued)

FOREIGN PATENT DOCUMENTS

| | | |
|---|---|---|
| JP | 9-70686 | 3/1997 |
| JP | 10-193168 | 7/1998 |

(Continued)

*Primary Examiner* — Roy ZKing
*Assistant Examiner* — Ngoclan T Mai
(74) *Attorney, Agent, or Firm* — Oblon, Spivak, McClelland, Maier & Neustadt, L.L.P.

(57) ABSTRACT

Provided are a method for producing a clad material, and a clad material which can prevent a brazing filler metal layer from having a higher melting point so as to prevent the strength degradation and thermal deformation of a metal material, which can reduce production costs, which can reduce in thickness the layer to prevent sagging of the brazing filler metal upon brazing and which can improve press formability. A powder press-fixing machine is used to press-fix metal powder to surfaces of a base material uncoiled from a coil by an uncoiler. In order to provide a required composition of brazing filler metal, at least two kinds of metal powder is mixed, the mixed powder being press-fixed to the base material to form the brazing filler metal layer, the brazing filler metal constituting the layer having the composition such that copper is added with at least phosphor to lower a melting point of the same relative to that of copper, thus producing the clad material.

8 Claims, 4 Drawing Sheets

U.S. PATENT DOCUMENTS

| | | | |
|---|---|---|---|
| 4,218,248 A * | 8/1980 | Snyder et al. | 106/1.12 |
| 5,377,899 A * | 1/1995 | Hashimoto | 228/117 |
| 2003/0085258 A1 | 5/2003 | Ishio et al. | |
| 2006/0163322 A1 | 7/2006 | Mochizuki et al. | |

FOREIGN PATENT DOCUMENTS

| | | |
|---|---|---|
| JP | 10-249578 | 9/1998 |
| JP | 11 58072 | 3/1999 |
| JP | 11-58072 | 3/1999 |
| JP | 2003 136278 | 5/2003 |
| JP | 2004 25251 | 1/2004 |
| JP | 2004 82218 | 3/2004 |
| JP | 2004 114158 | 4/2004 |
| JP | 2005 186127 | 7/2005 |
| JP | 2006 297430 | 11/2006 |

* cited by examiner (a)                          (b)

METHOD FOR PRODUCING CLAD MATERIAL, AND CLAD MATERIAL

TECHNICAL FIELD

The present invention relates to a method for producing a clad material, and a clad material.

BACKGROUND ART

In general, metals are joined together by brazing technique using brazing filler metals. Kinds of the brazing filler metals used such as copper-phosphorus and nickel brazings are various depending on kinds of metals to be joined together.

Copper-phosphorus brazings are brazing filler metals exclusively for copper and copper alloys and are generally constituted by copper added with 4-9% of phosphor in mass percentage so as to lower melting points. Among the brazing filler metals, copper-phosphorus brazing called BCuP-2 in JIS standard Z3264 is an copper alloy add with 6.8-7.5% of phosphor and is widely used for brazing in a gas appliance, a refrigerating machine and other copper products.

The copper-phosphorus brazing called BCuP-2 in the JIS standard, which has inferior workability and is hardly rolled into sheet due to lack of ductility at room temperature, is generally on the market in the form of wire, rod or powder.

For example, fins of a plate-type heat exchanger in the form of pressed metal sheets into corrugation are provided by brazing ridges and valleys of the sheets together. This require a process of setting wire- or powder-like copper-phosphorus brazing over portions to be joined of the metal sheets, which is troublesome and tends to block improvement in productivity.

Thus, it is expected that if a clad material comprising a metal sheet as base material and a brazing filler metal layer formed on the metal sheet were produced and used as fin blanks to be brazed for the above-mentioned plate type heat exchanger, the setting process of the brazing filler metal might be omitted to allow carrying out all production processes in succession and in an automated manner, resulting in improved productivity and reduced costs.

FIG. 1 is a schematic view showing a producing apparatus used for carrying out a method for producing a clad material through usual rolling. The producing apparatus comprises a base material uncoiler 3 for uncoiling a base material coil 2 which is a coiled base material 1 in the form of metal sheet, a foreign material uncoiler 6 for uncoiling a foreign material coil 5 which is a coiled foreign material 4 in the form of different kind of metal sheet, a cladding rolling mill 7 for rolling the base and foreign materials 1 and 4 in an overlapped manner and a clad material coiler 10 for coiling the clad material 8' rolled in the rolling mill 7 as clad material coil 9.

In the method for producing the clad material shown in FIG. 1, the base and foreign materials 1 and 4 are uncoiled from the coils 2 and 5 by the uncoilers 3 and 6, respectively. The uncoiled base and foreign materials 1 and 4 are overlapped together and rolled by the rolling mill 7 into the clad material 8' which is coiled by the coiler 10 into the clad material coil 9.

The clad material 8' from the rolling mill 7 has a cross-section as shown in FIG. 2 such that the foreign material 4 is press-fixed to the base material 1 to provide a brazing filler metal layer 11'.

As the base material 1, various kinds of metals may be used. It has been proposed, for example, to produce a clad material 8' constituted by a copper sheet as base material 1 and a sheet of copper-phosphorus alloy as foreign material 4, said copper-phosphorus alloy sheet having below-standard phosphor content (3% or so) in mass percentage less than 4.5% in the standard copper-phosphorus brazing filler metal called BCuP-1 so as not to be broken upon rolling.

State of art concerning the above-mentioned clad material has been disclosed, for example, in Patent Literature 1.
[Patent Literature 1] JP 2004-114158A

SUMMARY OF INVENTION

Technical Problems

However, as mentioned in the above, when the sheet of copper-phosphorus alloy with the phosphor content being lowered to about 3% in mass percentage is used as foreign material 4, the resultant clad material 8' has the brazing filler metal layer 11' with a melting point increased by the lowered phosphor content. Corresponding increase in brazing temperature in comparison with that of the JIS standard product may disadvantageously result in strength degradation and thermal deformation of the base material 1.

Since the sheet of foreign material 4 itself is produced by rolling, the rolling must be repeatedly carried out so as to make thickness t' of the brazing filler metal layer 11' less than 100 μm. The repeated rolling is, however, commercially unfavorable since it leads to increase in production costs. On the other hand, if the repeated number of rolling is reduced for reduction of the production costs to thereby obtain the thickness of the brazing filler metal layer 11' in the order of about 100 μm, such thick brazing filler metal layer 11' may actually cause sagging of the brazing filler metal upon brazing; the brazing filler metal layer 11' may be cracked upon press forming into the clad material 8'.

The invention was made in view of the above and has its object to provide a method for producing a clad material, and a clad material which can prevent a brazing filler metal layer from having a high melting point to thereby prevent strength degradation and thermal deformation of the metal material, which can reduce production costs, which can decrease in thickness the brazing filler metal layer to prevent sagging of the brazing filler metal upon brazing and which can improve press formability.

Solution to Problems

The invention is directed to a method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filter metal constituting the brazing filler metal layer having the composition such that copper is added with at least phosphor to have a melting point lower than that of copper.

In the method for producing the clad material, the mixed powder constituting said brazing filler metal may be a mixture of at least copper powder with copper-phosphorus alloy powder.

In the method for producing the clad material, phosphor contained in said copper-phosphorus alloy powder may be 7-9% in mass percentage. It can be read out from the status view in FIG. 6 that copper-phosphorus alloy with 8.38% P has lowest melting point and therefore is basic; in tests conducted, the alloys produced to have 7-9% P were used.

In the method for producing the clad material, the copper powder in the mixed powder of said copper powder with copper-phosphorus alloy powder may be 12-40% in mass percentage.

In the method for producing the clad material, phosphor contained in the brazing filler metal layer through press-fixing of the brazing filler metal constituted by said mixed powder to the metal material may have mass percentage in a range of 4.2-7.9%. Since the mean concentrations of phosphor shown in Tables 1 and 2 are values in terms of 8% P, the mass percentage of phosphor corresponding to 7%-9% P is in a range of 4.2-7.9%. (Incidentally, 4.2%=7%×(100%-40%); and 7.9% 9%×(100%-12%).)

In the method for producing the clad material, the brazing filler metal layer through press-fixing of the brazing filler metal constituted by the mixed powder to the metal material may have mean thickness of 90 μm or less.

The invention is also directed to a method for producing a clad material which comprises mixing at least two kinds of metal powder to provide a required composition of brazing filler metal, press-fixing the brazing filler metal constituted by the mixed powder to a metal material to form a brazing filler metal layer, said brazing filler metal layer through press-fixing of the brazing filler metal constituted by said mixed powder to the metal material having mean thickness of 90 μm or less.

Further, the invention is directed to a method for producing a clad material which comprises mixing at least two kinds of metal powder to provide a required composition of brazing filler metal, press-fixing the brazing filler metal constituted by the mixed powder to a metal material to form a brazing filler metal layer and heating the clad material with said brazing filler metal layer to liquid-phase sinter the brazing filler metal constituted by said mixed powder press-fixed. The liquid-phase sintering increases strength in junction between the brazing filler metal layer and the metal material, which makes it possible to carry out heavy deformation by pressing such as deep drawing.

The invention is also directed to a clad material comprising brazing filler metal constituted by mixed powder of at least two kinds of metal powder, said brazing filler metal being press-fixed to a metal material to form a brazing filler metal layer, said brazing filler metal layer being a sintered metal body, said sintered metal body constituting the brazing filler metal layer being a mixture of at least copper powder with copper-phosphorus alloy powder. With respect to a clad material which needs no heavy deformation by pressing such as deep drawing and thus requires no liquid-phase sintering, used is a sintered body which is produced with a temperature of a furnace used being lowered.

In said clad material, the copper powder in the mixed powder of said at least copper powder with copper-phosphorus alloy powder may be 12-40% in mass percentage.

In said clad material, the brazing-filler-metal constituting component of said brazing filler metal layer contains at least copper and phosphor, phosphor contained in said brazing filler metal may have mass percentage in a range of 4.2-7.9%.

In said clad material, said brazing filler metal layer may have mean thickness of 90 μm or less.

Further, the invention is directed to a clad material comprising brazing filler metal constituted by mixed powder of at least two kinds of metal powder, said brazing filler metal being press-fixed to a metal material to form a brazing filler metal layer, said brazing filler metal layer having mean thickness of 90 μm or less.

Advantageous Effects of Invention

According to a method for producing a clad material, and a clad material of the invention, excellent effects and advantages can be obtained. The brazing filler metal layer is prevented from having a higher melting point to thereby prevent strength degradation and thermal deformation of the metal material. Production costs can be reduced. Thickness of the brazing filler metal layer can be made thinner to prevent sagging of the brazing filler metal upon brazing. Further, press formability can be improved.

| Reference Signs List | |
|---|---|
| 1 | base material (metal material or metal sheet) |
| 2 | base material coil |
| 3 | base material uncoiler |
| 8 | clad material |
| 9 | clad material coil |
| 10 | clad material coiler |
| 11 | brazing filler metal layer |
| 12 | powder press-fixing machine |
| 13 | heating furnace |
| 14 | roll |
| 15 | powder feeder |
| 18 | rolling mill |
| t | thickness |

DESCRIPTION OF EMBODIMENTS

Next, an embodiment of the invention will be described in conjunction with the attached drawings.

Figure 1:
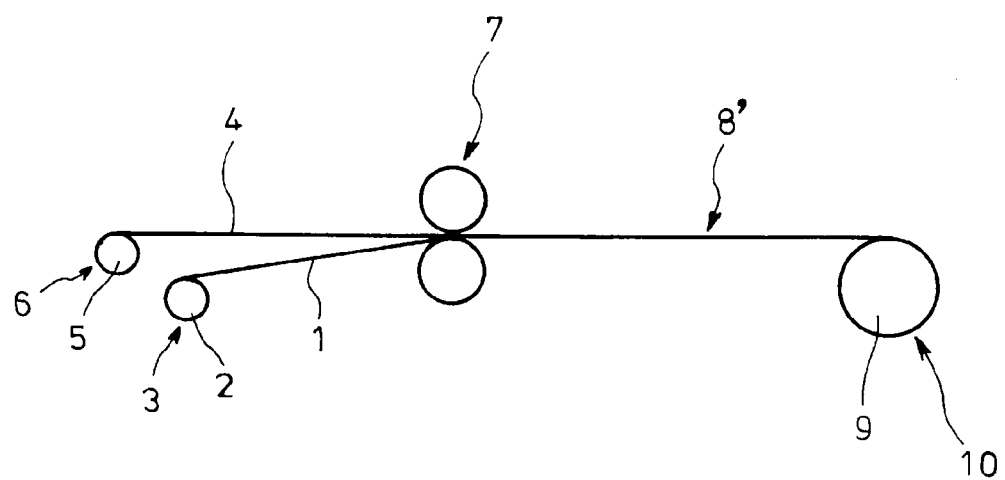
FIG. 1 is a schematic view showing a producing apparatus used for carrying out a method for producing a clad material through usual rolling.
Figure 2:
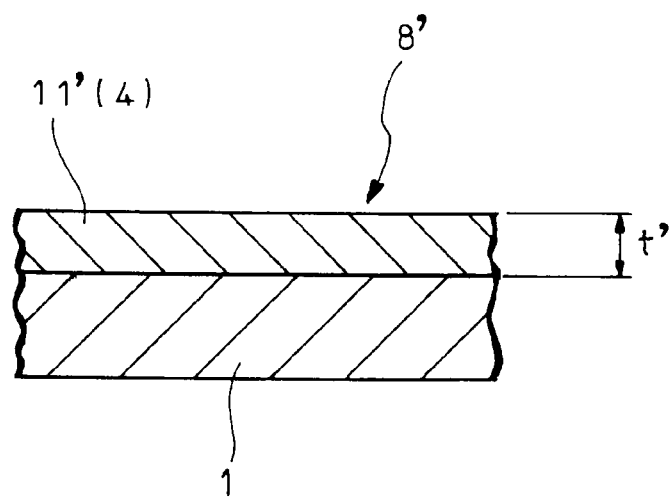
FIG. 2 is an enlarged sectional view showing a conventional clad material.
Figure 3:
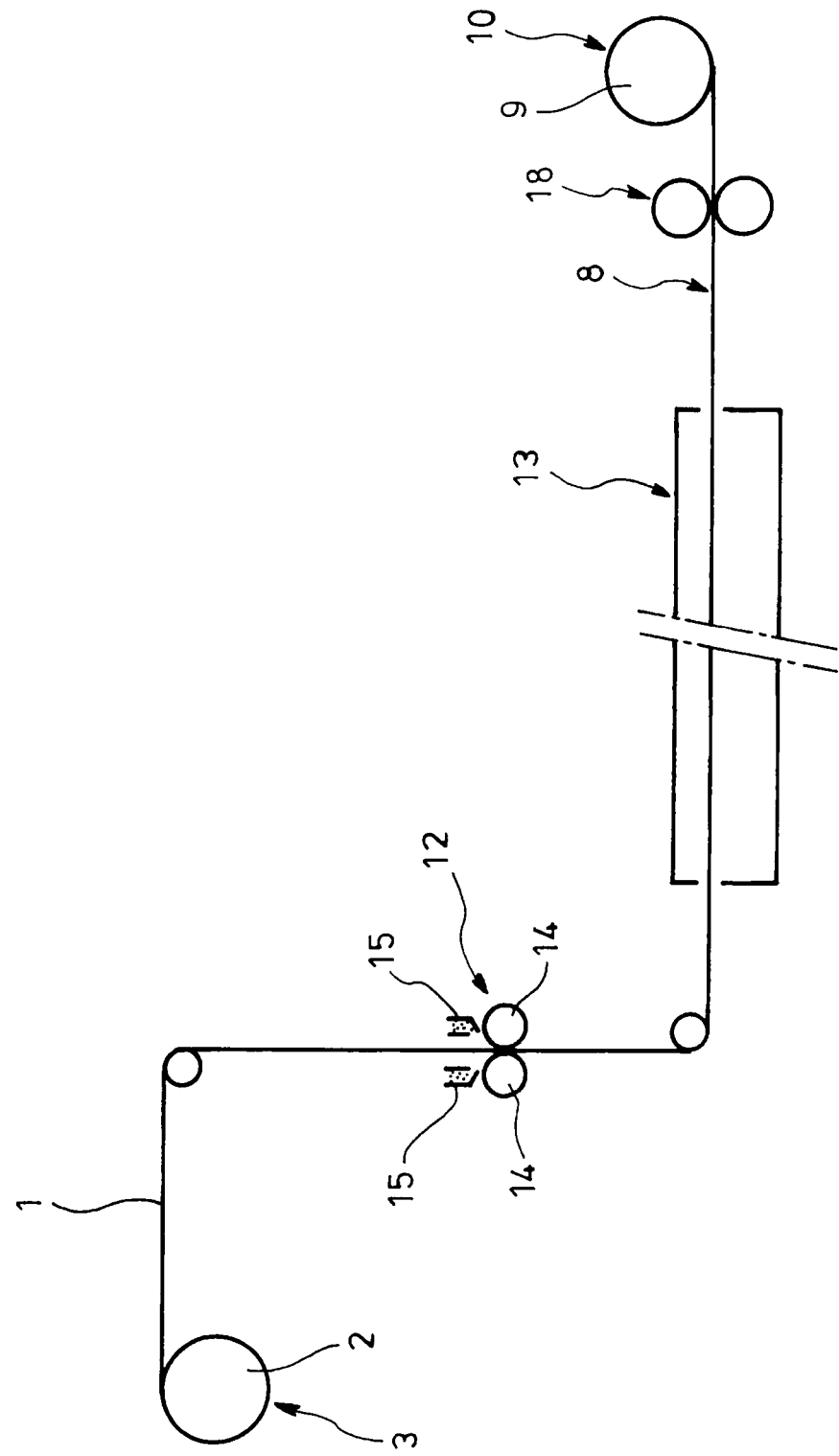
FIG. 3 is a schematic view showing an embodiment of a producing apparatus for carrying out a method for producing a clad material according to the invention.

FIG. 3 shows the embodiment of the invention in which a producing apparatus for a clad material comprises a base material uncoiler 3 for uncoiling a base material coil 2 which is a coiled base material 1 as metal material in the form of for example metal sheet, a powder press-fixing machine 12 for press-fixing metal powder to a surface of the base material 1 unwound from the coil 2 by the uncoiler 3, a heating furnace 13 for heating the clad material 8, which comprises the base material 1 and the metal powder press-fixed to the material 1 by the press-fixing machine 12, to sinter or melt the metal powder, a rolling mill 18 for rolling the clad material 8 with the metal powder sintered or melted in the furnace 13 and a clad material coiler 10 for coiling the clad material 8 rolled in the rolling mill 18 as clad material coil 9.

The powder press-fixing machine 12 comprises two rotatable rolls 14 arranged horizontally and powder feeders 15 which feed the metal powder to the respective rolls 14, the metal powder being fed from the powder feeders 15 onto the respective rolls 14 while the base material 1 is downwardly guided from above to between the rolls 14, the metal powder being press-fixed to opposite surfaces of the base material 1 through rotation of the respective rolls 14.

In the heating furnace 13, the metal powder is sintered through either solid phase sintering where metal powder is sintered without being melted or liquid phase sintering where the metal powder is melted (into liquid phase) and is sintered.

Figure 4:
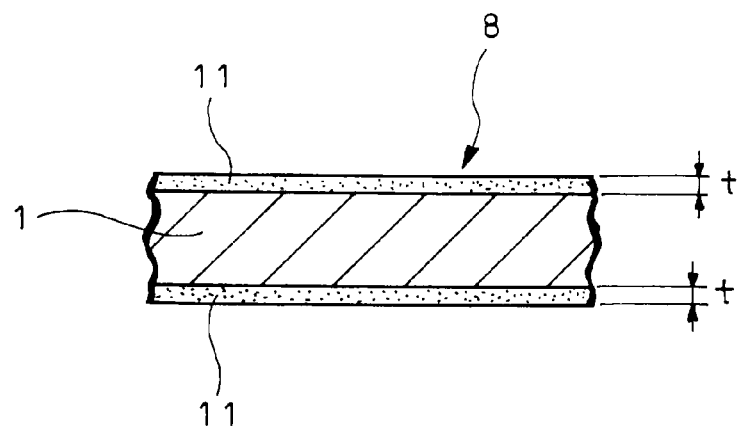
FIG. 4 is an enlarged sectional view showing a clad material produced by the producing apparatus shown in FIG. 3.

Then, the above-mentioned producing apparatus can be used to form the brazing filler metal layer 11 with thickness t of less than 100 μm on the surfaces of the base material 1 as shown in FIG. 4, so that the metal powder press-fixed to the base material 1 is changed in composition to produce the clad material 8. Brazing and press tests were carried out with respect to the produced clad material 8.

Figure 6:
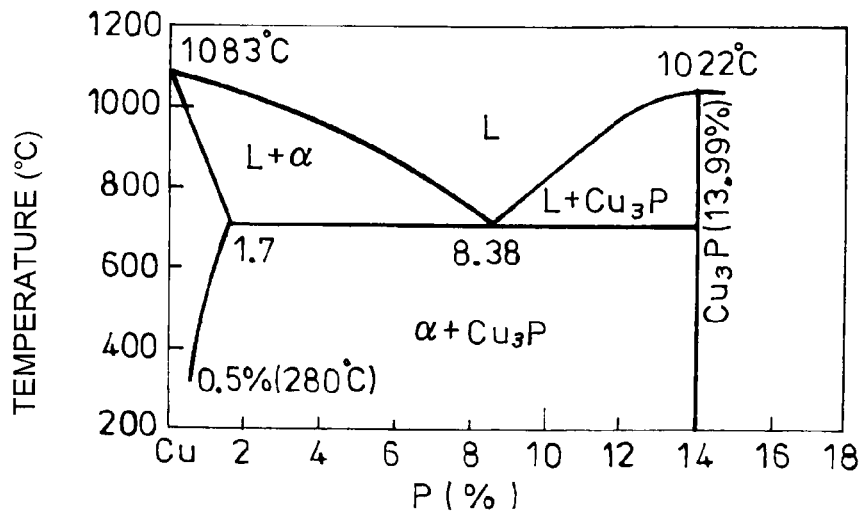
FIG. 6 is a Cu—P binary alloy standard status view.

In order to attain a required composition of brazing filler metal, mixed powder comprising at least two kinds of metal powder are used. The brazing filler metal is, for example, copper-phosphorus brazing filler metal, and the mixed powder used, which constitutes the copper-phosphorus brazing filler metal, is a mixture of copper powder with copper-phosphorus alloy powder. It can be read out from the status view of FIG. 6 that copper-phosphorus alloy with 8.38% P has lowest melting point and therefore is basic; in the tests conducted, the alloys produced to have 7-9% P were used. That is, Cu-8% P powder with phosphor in the copper-phosphorus alloy powder being in a range of 7%-9% in mass percentage was used as the copper-phosphorus alloy powder and the copper powder added to the Cu-8% P powder was varied in mass percentage to the whole of the mixed powder into 12%, 20%, 30%, 40% and 50% as shown in Table 1 below.

In the produced clad material 8, the brazing filler metal layer 11 is constituted by copper and copper-phosphorus alloy, mean mass percentage of phosphor being within a range of 4-7%.

Figure 5:
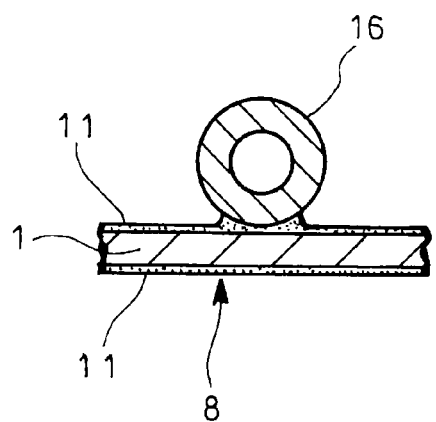
FIGS. 5(a) and 5(b) are enlarged sectional views showing a surface of the clad material joined with a pipe and a sheet as line- and plane-joining test pieces, respectively.
Figure 5:
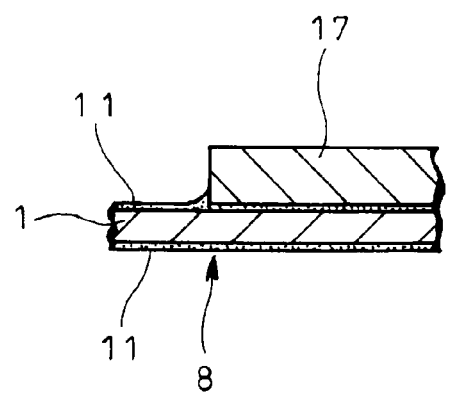

The brazing tests conducted were tests wherein a line-joining test piece in the form of pipe 16 with diameter of 2 mm and thickness of 0.5 mm was joined to the surface of the clad material 8 as shown in FIG. 5(*a*) and tests wherein a plane-joining test piece in the form of sheet 17 with size of 50 mm×25 mm and with thickness of mm was joined to the surface of the clad material 8 as shown in FIG. 5(*b*). Observed in the respective cases were conditions of fillets and surface conditions of the clad materials after the brazing.

Brazing conditions used were, in a continuous atmosphere furnace:

heating zone preset temperature: 850° C., 900° C.

heating zone length: 600 mm heating time: about 30 minutes heating atmosphere: nitrogen Results of the brazing tests were as shown in Tables 1 and 2 below.

TABLE 1

Brazing temperature of 850° C.

| mixed ratio of copper (Cu) (mass %) | mixed ratio of copper-phosphorus alloy (Cu—8%P) powder (mass %) | mean concentration of phosphorus (P) in brazing filler material after sintering (mass %) | state of fillet | state of surface of clad material after brazing |
|---|---|---|---|---|
| 12 | 88 | 7.0 | fine | good |
| 20 | 80 | 6.4 | fine | good |
| 30 | 70 | 5.6 | good | good |
| 40 | 60 | 4.8 | fair | good |
| 50 | 50 | 4.0 | fair | fair |

TABLE 2

Brazing temperature of 900° C.

| mixed ratio of copper (Cu) (mass %) | mixed ratio of copper-phosphorus alloy (Cu—8%P) powder (mass %) | mean concentration of phosphorus (P) in brazing filler material after sintering (mass %) | state of fillet | state of surface of clad material after brazing |
|---|---|---|---|---|
| 12 | 88 | 7.0 | fine | good |
| 20 | 80 | 6.4 | fine | good |
| 30 | 70 | 5.6 | fine | good |
| 40 | 60 | 4.8 | good | good |
| 50 | 50 | 4.0 | fair | fair |

Specifically, it was confirmed when the brazing temperature was 850° C. that fillet condition was slightly deteriorated with mass percentage of the copper powder in the mixed powder of the copper powder with the copper-phosphorus alloy powder being 40% and that the fillet condition was slightly deteriorated and the clad material after the brazing tends to have prominent surface roughness with the mass percentage of the copper powder in the mixed powder of the copper powder with the copper-phosphorus alloy powder being 50%. This means that the more the added amount of the copper powder is increased, the more the concentration of phosphor among the whole is reduced, resulting in increase of melting point of the brazing filler metal layer 11 (see Cu—P binary alloy standard status view of FIG. 6); thus, brazability is deteriorated as the brazing temperature is lowered. With the brazing temperature increased a little into 900° C., it was confirmed that good brazability with no defects was obtained when the mass percentage of the copper powder in the mixed powder of the copper powder with the copper-phosphorus alloy powder was in a range of 12-40%.

Figure 7:
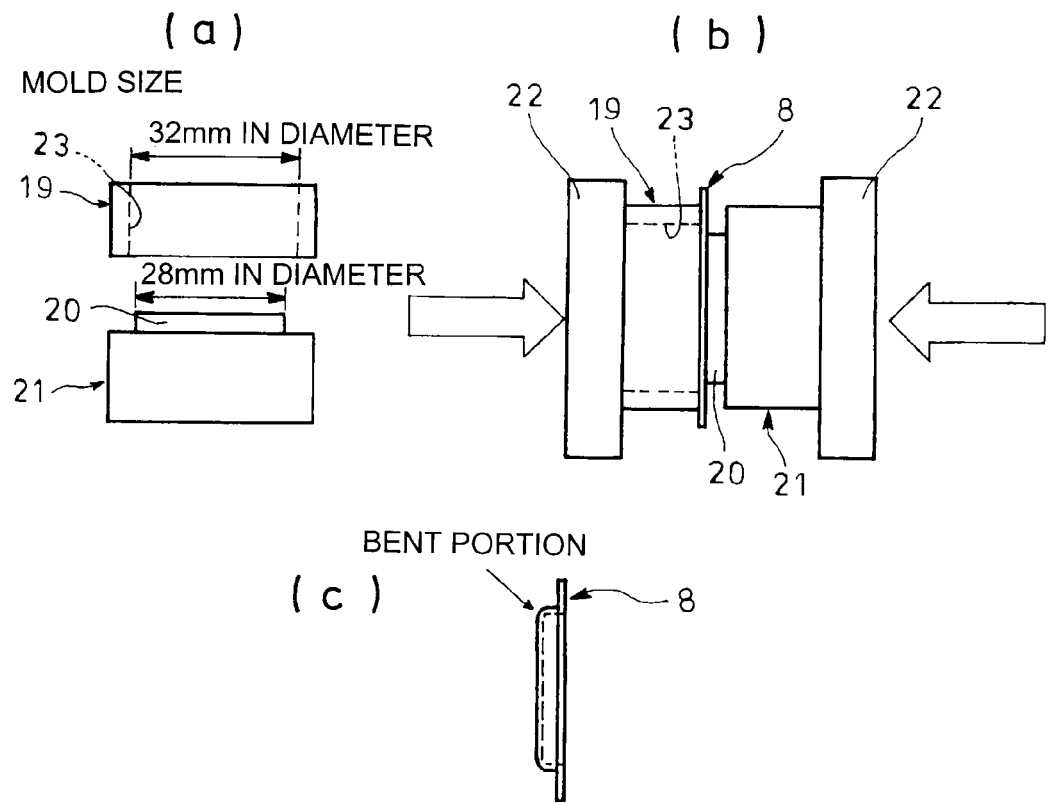
FIGS. 7(a), 7(b) and 7(c) are a view showing male and female molds used in press tests for clad material, a view showing a condition for carrying out a press test and a view showing a clad material as pressed test piece, respectively.

In the press tests, a female mold 19 with an opening 23 having a diameter of 32 mm and a male mold 21 with a projection 20 having a diameter of 28 mm were used as shown in FIG. 7(*a*). As shown in FIG. 7(*b*), the clad material 8 produced with the added amount of copper powder, the thickness of the base material 1 and the sintering temperature being varied was arranged between the female and male molds 19 and 21 which were clamped by a vise 22 to press the clad material 8 into configuration as shown in FIG. 7(*c*) and condition of the bent portion was observed.

Results of the pressing tests are as shown in Table 3 below.

thick. It was confirmed from production tests that the thickness of 90 μm or less permits normal press-fixing and can actually prevent the brazing filler metal from sagging upon brazing. In order to ascertain a relationship between press formability and thickness of the brazing filler metal layer 11, press tests similar to those mentioned in the above and tests of bending the clad material 8 by 90° were carried out to observe the respective bent portions.

The results of the press tests and the tests of bending the clad material 8 by 90° are as shown in Table 4 below.

TABLE 3

| mixed ratio of copper (Cu) (mass %) | mixed ratio of copper-phosphorus alloy (Cu—8%P) powder (mass %) | mean concentration of phosphorus (P) in brazing filler material after sintering (mass %) | thickness of base material (μm) | status of press-bent portion |
|---|---|---|---|---|
| 12 | 88 | 7.0 | 150 | Fair |
|    |    |     | 300 | Fair |
|    |    |     | 400 | Fair |
| 20 | 80 | 6.4 | 150 | Good |
| 30 | 70 | 5.6 | 150 | Good |
|    |    |     | 300 | Good |
|    |    |     | 400 | Good |
| 40 | 60 | 4.8 | 150 | Good |
|    |    |     | 300 | Good |
|    |    |     | 400 | Good |

Specifically, with respect to press formability, increase in added amount of copper powder which has higher ductility prevents the bent portion from being cracked; however, as mentioned previously, increase in added amount of the copper powder lowers the concentration of phosphor as a whole, resulting in increase in melting point of and deterioration of

TABLE 4

| mixed ratio of copper (Cu) (mass %) | mixed ratio of copper-phosphorus alloy (Cu—8% P) powder (mass %) | mean concentration of phosphorus (P) in brazing filler material after sintering (mass %) | thickness of base material | thickness of base material (μm) | status of press-bent portion | status of 90° bent portion |
|---|---|---|---|---|---|---|
| 20 | 80 | 6.4 | 400 | 30 | good | Good |
|    |    |     |     | 60 | fair | Fair |
| 30 | 70 | 5.6 | 400 | 30 | good | Good |
|    |    |     |     | 60 | fair | Fair | brazability of the brazing filler metal layer 11. For satisfaction of both the brazability and the press formability, it is effective to have the mass percentage of the copper powder in the mixed powder of the copper powder with the copper-phosphorus alloy powder in a range of 12-40%, more preferably, 20-30%.

Normal press-fixing fails when the brazing filler metal layer 11 resulting from heating and sintering of the base material 1 to which the mixed powder is press-fixed is too Specifically, it was confirmed that when the brazing filler metal layer 11 has thickness of 60 μm, cracks are believed to be generated due to great difference in elongation of the layer relative to that of the base material 1, resulting in hardness in workability; from the viewpoint of press formability, it is preferable that the thickness of the brazing filler metal layer 11 is 30 μm or less. If the brazing filler metal layer 11 cannot have thickness of 10 μm or more, there is high possibility of occurrence of improper brazing; thus, it is further preferably effective that the brazing filler metal layer has thickness of 10-30 μm.

Thus, by producing the clad material 8 with composition of the brazing filler metal and thickness of the brazing filler metal layer 11 being controlled, using the production device as mentioned in the above, the melting point of the brazing filler metal layer 11 is prevented from being raised to prevent the strength degradation and thermal deformation of the metal material; production costs can be decreased; the brazing filler metal layer 11 can be decreased in thickness to thereby prevent sagging of the brazing filler metal upon brazing and the press formability can be improved.

It is to be understood that a method for producing a clad material, and a clad material according to the invention are not limited to the above embodiment and that various changes and modifications may be made without departing from the scope of the invention.

The invention claimed is:

1. A method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filler metal constituting the brazing filler metal layer having the composition such that copper is added with at least phosphor to have a melting point lower than that of copper;
   wherein the mixed powder constituting said brazing filler metal is a mixture of at least copper powder with copper phosphorus alloy powder; and
   wherein the copper powder contained in the mixed powder of said copper powder with copper-phosphorus alloy powder is 12-40 in mass percentage.

2. A method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filler metal constituting the brazing filler metal layer having the composition such that copper is added with at least phosphor to have a melting point lower than that of copper;
   wherein the mixed powder constituting said brazing filler metal is a mixture of at least copper powder with copper-phosphorus alloy powder;
   wherein phosphor contained in said copper-phosphorus alloy powder is 7-9 in mass percentage; and
   wherein the copper powder in the mixed powder of said copper powder with copper-phosphorus alloy powder is 12-40 in mass percentage.

3. A method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filler metal constituting the brazing filler metal layer having the composition such that copper is added with at least phosphor to have a melting point lower than that of copper; and
   wherein phosphor contained in the brazing filler metal layer through press-fixing of the brazing filler metal constituted by said mixed powder to the metal material has mass percentage in a range of 4.2-7.9%.

4. A method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filler metal constituting the brazing filler metal layer having the composition such that copper is added with at least phosphor to have a melting point lower than that of copper;
   wherein the mixed powder constituting said brazing filler metal is a mixture of at least copper powder with copper-phosphorus alloy powder; and
   wherein phosphor contained in the brazing filler metal layer through press-fixing of the brazing filler metal constituted by said mixed powder to the metal material has mass percentage in a range of 4.2-7.9%.

5. A method for producing a clad material which comprises mixing at least two kinds of metal powder together to provide a required composition of brazing filler metal, and press-fixing the brazing filler metal constituted by the mixed powder to a metal material to form a brazing filler metal layer, said brazing filler metal constituting the brazing filler metal layer having the composition such that copper is added with at least phosphor to have a melting point lower than that of copper;
   wherein the mixed powder constituting said brazing filler metal is a mixture of at least copper powder with copper-phosphorus alloy powder;
   wherein phosphor contained in said copper-phosphorus alloy powder is 7-9 in mass percentage; and
   wherein phosphor contained in the brazing filler metal layer through press-fixing of the brazing filler metal constituted by said mixed powder to the metal material has mass percentage in a range of 4.2-7.9%.

6. The method for producing a clad material as claimed in claim 1, wherein phosphor contained in the brazing filler metal layer through press-fixing of the brazing filler metal constituted by said mixed powder to the metal material has mass percentage in a range of 4.2-7.9%.

7. The method for producing a clad material as claimed in claim 2, wherein phosphor contained in the brazing filler metal layer through press-fixing of the brazing filler metal constituted by said mixed powder to the metal material has mass percentage in a range of 4.2-7.9%.

8. The method for producing a clad material as claimed in any one of claims 1-7, wherein the brazing filler metal layer through press-fixing of the brazing filler metal constituted by said mixed powder to the metal material has mean thickness of 90 μm or less.

\* \* \* \* \*